Oct. 23, 1956  W. L. KONRAD  2,768,371
SOUND SIMULATOR FOR USE IN AIRCRAFT PILOT TRAINERS
Filed June 9, 1955
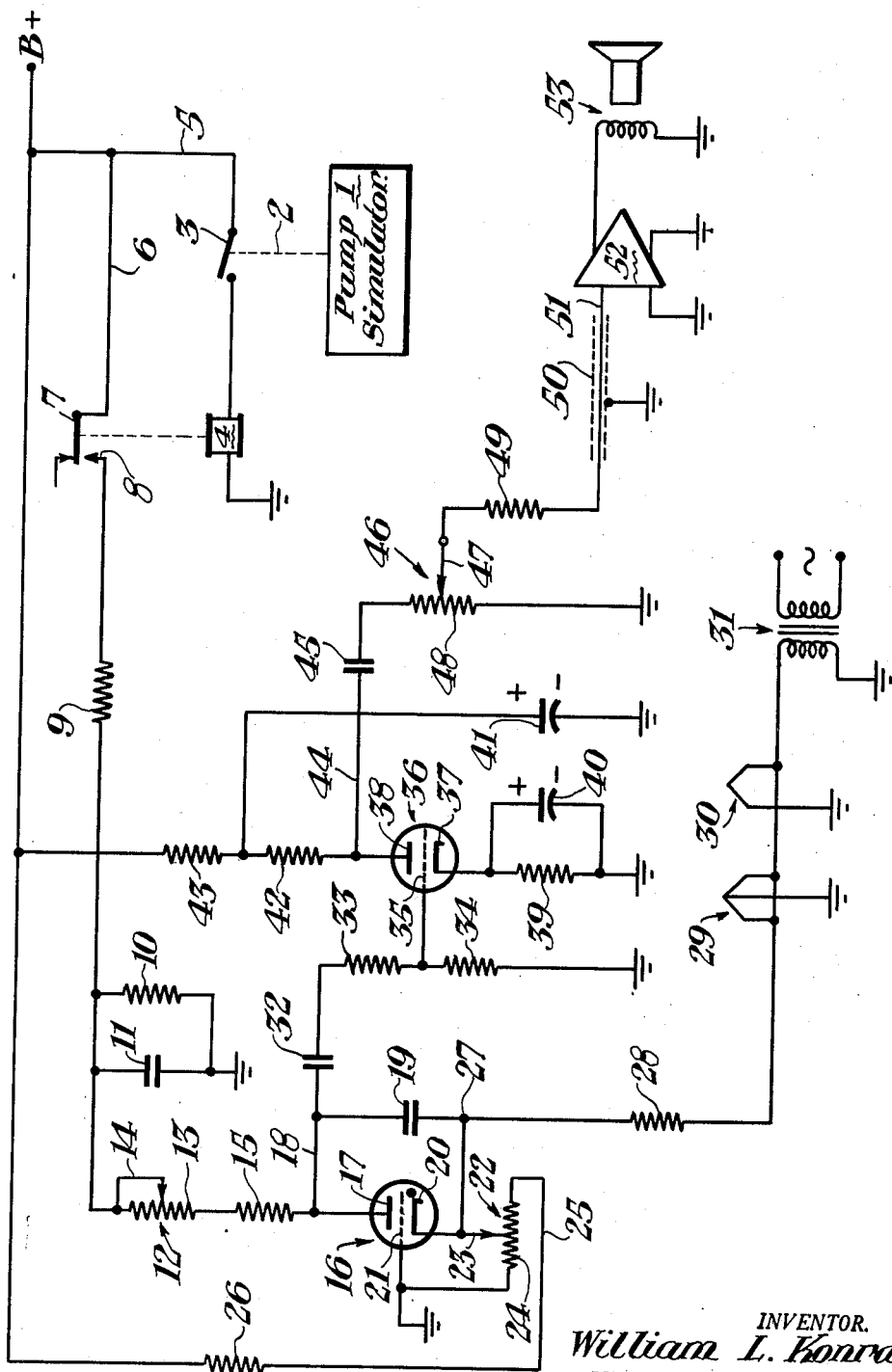
INVENTOR.
William L. Konrad.
BY W. L. Stout
HIS ATTORNEY

United States Patent Office 2,768,371
Patented Oct. 23, 1956

2,768,371

SOUND SIMULATOR FOR USE IN AIRCRAFT PILOT TRAINERS

William L. Konrad, Pittsburgh, Pa., assignor to Westinghouse Air Brake Company, Wilmerding, Pa., a corporation of Pennsylvania Application June 9, 1955, Serial No. 514,332

3 Claims. (Cl. 340—384)

This invention relates to flight simulators for use in pilot training, and particularly to an improved sound simulator therefor.

Flight simulators for use in transitional pilot training have been highly developed to create a training environment approximating as closely as possible the conditions which will be encountered in flight. To accomplish this purpose, not only must the visible surroundings simulate those in an operational aircraft, but also the sounds heard by the pilot in training must conform to those which will be heard in flight.

A characteristic sound peculiar to modern aircraft is that made by the hydraulic pump motor, which starts when the system pressure falls below a predetermined level and shuts off when the pressure is restored. The sound is initially low in pitch, increasing in pitch and volume to a high-pitched whine during pumping, and finally decreasing in pitch and volume as the motor slows to a stop at the end of a pumping cycle. Such sounds have previously been simulated by the use of recordings. However, a recording is unsatisfactory in this instance, because the frequency of pumping in actual flight depends upon the amount of use made by the pilot of apparatus served by the hydraulic system. The present invention provides an electrical means for simulating the sound of a motor starting, running and stopping, which is particularly adapted for use in transitional pilot trainers to produce the sound characteristic of a pump motor in operation in a realistic and inexpensive manner.

Accordingly, it is an object of my invention to provide a system for simulating the sound of a motor starting, running and stopping.

It is a further object of my invention to provide an improved oscillator control circuit.

It is a further object of my invention to provide an automatic frequency control network for a relaxation oscillator.

Other objects and further advantages of my invention will be apparent to those skilled in the art as the description proceeds.

I shall describe one embodiment of my invention, and shall then point out the novel features thereof in claims.

The drawing comprises a single figure showing a wiring diagram of one embodiment of my invention.

Referring to the drawing, the apparatus of my invention is adapted to be employed in conjunction with a conventional transitional pilot trainer, which may include a suitable hydraulic pump simulator 1. The details of such a simulator do not form a part of the present invention, and accordingly are not shown. However, for example, pump simulator 1 might comprise a motor driving a cam to operate switch 3 through shaft 2 to establish a pumping cycle depending on the simulated engine speed set by the pilot-trainee. The engine speed setting could be employed to control the speed of the motor in simulator 1 by the use of conventional control means which are well known in the art and which need not be further described. Accordingly, switch 3 is periodically operated from simulator 1 through shaft 2 to simulate the hydraulic pumping cycle.

Switch 3 connects relay 4 to a conventional source of potential as indicated at B+ through lead 5. Operation of relay 4 also connects the source to an oscillator comprising tube 16 through lead 6, arm 7 and front contact 8 of relay 4.

Oscillator 16 operates in a manner to be described to produce a signal for the duration of the pumping cycle which varies in frequency in a manner simulating the sound of a pumping motor. The output of the oscillator is coupled to a conventional amplifier 36, having an output circuit comprising volume control 46. The output across volume control 46 is applied through a shielded conductor 50, 51 to a conventional power amplifier 52 which actuates a loudspeaker 53.

The oscillator employed may comprise a modified relaxation oscillator as shown. Such an oscillator may include a gas triode such as thyratron 16, having a plate 17 coupled to front contact 8 of relay 4 through resistor 15, adjustable resistor 12, across capacitor 11 and resistor 10, and through resistor 9. Grid 21 is connected to ground as shown. Cathode 20 is connected to wiper 23 of bias potentiometer 22 having resistor 24 grounded at one end and connected at the other end through lead 25 and resistor 26 to B+. A capacitor 19 is connected between plate lead 18 and the cathode as shown. A conventional filament transformer 31 is provided to supply filaments 29 and 30 of tubes 16 and 36, respectively. Part of the heater voltage is tapped off through resistor 28 to potentiometer 22 and applied to cathode 20 at terminal 27 for a purpose to be described.

The output of oscillator 16 on lead 18 is coupled to grid 35 of an amplifier comprising triode 36 through capacitor 32 and a potential divider comprising resistors 33 and 34. While any suitable amplifier might be employed, as here shown the amplifier comprises a triode 36 having a cathode 37 connected to ground through biasing resistor 39 and bypass capacitor 40, and a plate 38 connected to B+ through resistors 42 and 43 in series. A suitable bypass condenser 41 is connected to ground between resistors 42 and 43. The output of amplifier 36 on lead 44 is coupled to a conventional volume control potentiometer 46 through capacitor 45. Potentiometer 46 comprises a resistor 48 and a wiper 47 which may be adjusted to provide the desired output volume. The output on wiper 47 is coupled through resistor 49 and shielded cable 51 as previously described to operate loud speaker 53.

The operation of this embodiment of my invention will now be described. Assume that switch 3 is closed to simulate the beginning of a pumping cycle. Relay 4 is picked up, engaging arm 7 with front contact 8 and connecting the source of voltage B+ over lead 6 to resistor 9. Resistors 9 and 10 operate as a potential divider. However, the voltage across resistor 10 will build up only gradually to its ultimate value because of the lag introduced by the charging of capacitor 11. Accordingly, the voltage across resistor 10 will gradually increase until capacitor 11 is fully charged, after which time it will remain constant. The voltage across resistor 10 is applied to plate 17 of the tube 16 through resistor 15 and adjustable resistor 12. Adjustable resistor 12 comprises a wiper 14 adjustable on resistor 13 to control the maximum frequency of the oscillator. The voltage between plate 17 and cathode 20 of tube 16 will lag the voltage across resistor 10 due to the charging of capacitor 19. Capacitor 19 will charge to a value determined by the grid bias level set by potentiometer 22, at which time the tube will conduct and discharge condenser 19. Oscillations will thereby be set up in a manner well known in the oscillator art.

The frequency of oscillation is basically determined by the R–C constant of components 9, 12, 15, 19, and 22, as well as the bias setting of grid 21 with the respect to cathode 20. However, an additional frequency control is provided in the present invention by capacitor 11 in parallel with resistance 10. While condenser 11 is charging, the voltage applied to the oscillator is below its maximum value and accordingly a longer time is required to charge condenser 19 to the value necessary to fire tube 16. Therefore, the oscillations will initially commence at a low frequency, increasing steadily as condenser 11 is charged to a higher frequency where they will remain constant as long as relay 4 is energized. At the end of the pumping cycle, pump simulator 1 operates to open switch 3, deenergizing relay 4, and thereby disconnecting the battery from the oscillator. A progressively decreasing voltage will be maintained across resistor 10 for the time required to discharge condenser 11, causing tube 16 to oscillate at a progressively decreasing frequency until capacitor 11 discharges to a point below the operating voltage of the tube.

The actual sound made by a motor in operation is not a smooth tone of uniform harmonic content. To simulate the inherent noise or roughness in the sound of an actual motor, resistor 28 is provided to couple some of the heater voltage, which will ordinarily be of a low frequency such as 60 cycles per second, into the tube circuit. The output of tube 16, combining the progressively varied oscillator frequency and the cross modulation introduced by resistor 28, is coupled through condenser 32 where it is amplified conventionally in tube 36, attenuated at volume control 46, and finally amplified in amplifier 52 to operate loudspeaker 53, which may be located in or near the pilot's compartment so as to be audible to the trainee.

While I have described one embodiment of my invention in detail, many modifications and changes in structure will be obvious to those skilled in the art upon reading this disclosure. Accordingly, I do not wish to be limited to the details shown, but only by the scope of the following claims.

Having thus described my invention, what I claim is:

1. A motor sound simulator, comprising, in combination, a relaxation oscillator, impedance means connected to said oscillator, switching means for connecting a source of voltage to said impedance means, control means for operating said switching means in accordance with periods of simulated motor operation, a capacitor shunting said impedance means, a source of low frequency voltage, means connecting said source to said oscillator, and a loudspeaker controlled by said oscillator.

2. In a sound simulator, in combination, a gas electron discharge device comprising a cathode, an anode, a control electrode, and a heater, a condenser connected between said cathode and said anode, means for biasing said control electrode, means coupling said heater to said cathode, a variable impedance charging circuit for said condenser, a time delay network shunting said variable impedance, switching means for applying a source of voltage to said charging circuit in parallel with said time delay network, and an output device controlled by said discharge device.

3. Means for simulating the sound of a pump motor in operation, comprising, a source of voltage, a relaxation oscillator comprising a condenser and a vacuum tube having a heater, a charging circuit for said condenser including an impedance shunted by a capacitor, switching means for connecting said source to said charging circuit for periods simulating motor operation, means connecting said heater in said charging circuit, and a loudspeaker controlled by said oscillator.

References Cited in the file of this patent

UNITED STATES PATENTS

| Number | Name | Date |
|---|---|---|
| 2,144,779 | Schlesinger | Jan. 24, 1939 |
| 2,455,472 | Curl et al. | Dec. 7, 1948 |
| 2,576,585 | Fleming | Nov. 27, 1951 |